United States Patent [19]
Sirazi et al.

[11] Patent Number: 4,586,179
[45] Date of Patent: Apr. 29, 1986

[54] MICROPROCESSOR RESET WITH POWER LEVEL DETECTION AND WATCHDOG TIMER

[75] Inventors: Semir Sirazi, Chicago; Thomas E. Zinger, Mt. Prospect, both of Ill.

[73] Assignee: Zenith Electronics Corporation, Glenview, Ill.

[21] Appl. No.: 560,086

[22] Filed: Dec. 9, 1983

[51] Int. Cl.⁴ .................................................. G06F 11/00
[52] U.S. Cl. ....................................... 371/12; 371/66; 371/62
[58] Field of Search ........................ 371/66, 62, 12, 5; 328/140, 141; 364/200, 900, 482

[56] References Cited

U.S. PATENT DOCUMENTS

| | | | |
|---|---|---|---|
| 3,795,800 | 3/1974 | Nimmo | 371/12 |
| 4,072,852 | 2/1978 | Hogan et al. | 371/12 |
| 4,282,574 | 8/1981 | Yoshida | 371/12 |
| 4,351,050 | 9/1982 | Higashiyama | 371/12 |
| 4,410,938 | 10/1983 | Higashiyama | 371/62 |
| 4,410,991 | 10/1983 | Lenart | 371/12 |
| 4,429,366 | 1/1984 | Kennon | 371/66 |
| 4,477,870 | 10/1984 | Kraux | 371/62 |
| 4,488,303 | 12/1984 | Abramovich | 371/62 |
| 4,513,417 | 4/1985 | Lamb et al. | 371/62 |

FOREIGN PATENT DOCUMENTS

| | | | |
|---|---|---|---|
| 0004848 | 1/1981 | Japan | 371/12 |
| 0052452 | 5/1981 | Japan | 371/12 |
| 2035633 | 4/1980 | United Kingdom | 371/12 |

Primary Examiner—Michael R. Fleming

[57] ABSTRACT

A combination watchdog timer and input voltage level detector circuit is coupled to a microcomputer (or microprocessor) for insuring proper operation thereof under various conditions. The watchdog timer is coupled to the microcomputer and is responsive to a status signal output by the microcomputer indicating the operating state thereof. Failure of the watchdog circuit to detect the status signal indicates that the microcomputer has become unstable or is in a locked up condition and causes the watchdog circuit to initiate a microcomputer reset by means of a reset trigger circuit. A voltage level detector is coupled to the input voltage source and to the reset trigger circuit for similarly initiating the resetting of the microcomputer in the event the input voltage to the microcomputer drops below a predetermined value. When power is initially applied, a power up detector coupled between the voltage level detector and the watchdog timer ensures that the reset trigger circuit maintains the microcomputer in a reset condition until the input voltage reaches a predetermined level to permit normal microcomputer operation. The present invention thus ensures that the microcomputer is maintained or is placed in a reset condition in the event of input power transients, upon initial application of power to the microcomputer, and upon the occurrence of irregularities in microcomputer program execution.

8 Claims, 9 Drawing Figures

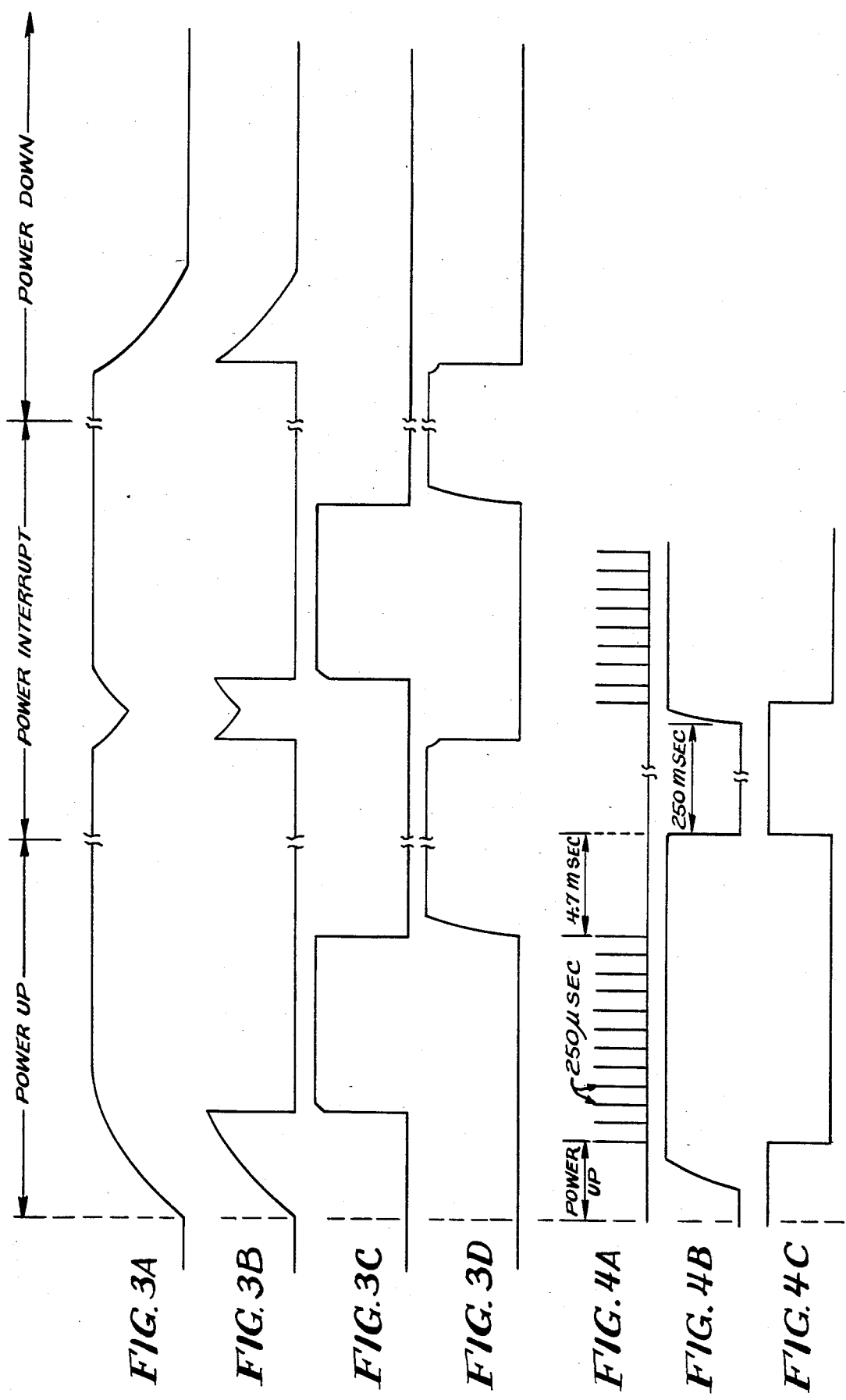

MICROPROCESSOR RESET WITH POWER LEVEL DETECTION AND WATCHDOG TIMER

BACKGROUND OF THE INVENTION

This invention relates generally to microcomputer or microprocessor-based systems and is specifically directed to the detection of abnormal operating conditions in a microcomputer/microprocessor-based system and to the initiation of normal microcomputer/microprocessor operation.

When power is applied to a system incorporating a microcomputer or microprocessor, which terms are used interchangeably for purposes of the present application, the microprocessor is typically energized after a suitable time delay. This time delay allows for system stabilization in order to permit various well-defined power supply levels to be provided to the microprocessor. The microprocessor then generally executes an initialization or reset routine wherein the microprocessor program counter is set to a zero count. The microprocessor then calls out the location in its read only memory (ROM) whose address is represented by the zero count in the program counter. The contents of that memory location initiates the initialization program routine which initializes the buffer pointer and output port latches of the microprocessor. In general, this initialization routine defines and establishes the initial conditions for microprocessor operation including a resetting of its logic to an initialized condition from which subsequent operation may proceed.

To accomplish this initialization process, generally two signals are provided to the microprocessor. One input is from a power supply which provides a well-defined voltage level necessary for proper logic circuitry operation. Another input, generally termed the power on reset signal, initiates the initialization routing previously described. These two inputs are generally provided by the same source, e.g., a DC power supply. The sequence in which these two inputs are provided to the microprocessor is important in that if the power on reset signal is removed, or goes high, after the input supply voltage drops to a specified voltage characteristic of the particular microprocessor involved, microprocessor initialization will be precluded and proper microprocessor operation will not be possible. In addition, the microprocessor is very sensitive to input power transients. For example, most microprocessors are designed to operate at a nominal input voltage of 5 VDC. If the input voltage drops below 4.5 VDC or exceeds 5.5 VDC, normal microprocessor operation will be interrupted.

Microprocessors and microcomputers include reset circuitry and/or program routines which effect the clearing of certain data from memory, the initialization of a stored program sequence, and in some cases the turnoff of certain load devices in response to a command signal generated upon application of input power to the system. In some cases, the system may provide an indication to the user of an input voltage transient or outage requiring the user to turn the system off and/or attempt to reset and restart it where the problem is suspected of only being transitory and no longer present. This approach to resuming normal microprocessor operation is unreliable and inconvenient and thus does not represent a preferred method.

A departure from the normal control routine of the microprocessor may be caused by a system malfunction other than an input power interrupt or loss. For example, faulty microprocessor operation may be due to a faulty system clock resulting in improper program execution. Thus, it is desirable to monitor the input power applied to a microprocessor as well as the execution of its program routine in order to detect and correct for departures from normal system operation. An unattended departure from the normal control routine in a microprocessor-based system may not only complicate or prevent the execution of the desired control operation, but may also in some instances pose a serious threat to the system and those operating the system or peripheral devices thereto.

The present invention is directed to the aforementioned problems by providing a single circuit for monitoring input power in a microprocessor-based system as well as the operation thereof for the purpose of initiating a microprocessor reset in the event of faulty microprocessor operation or input power interrupts.

OBJECTS OF THE INVENTION

Accordingly, it is an object of the present invention to provide for improved operation in a microprocessor-based system.

It is another object of the present invention to provide for the detection of anomalous operating conditions in a microprocessor-based system and the re-initialization of the microprocessor in initiating normal operation therein.

A further object of the present invention is to provide for the proper initialization of a microprocessor during initial application of power or following the loss of input power thereto.

A still further object of the present invention is to provide for the detection of initial application or loss of power to a microprocessor or irregularities in the execution of its operating program in order to reset the microprocessor for initiating the resumption of normal operation.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIGS. 3A through 3D represent a timing diagram of signal levels at selected points in the microprocessor reset system of FIG. 2 during the power reset of the microprocessor; and FIGS. 4A through 4C represent a timing diagram of signal levels at selected locations in the microprocessor reset system of FIG. 2 during the watchdog reset of the microprocessor.

DESCRIPTION OF THE PREFERRED EMBODIMENT

Figure 1:
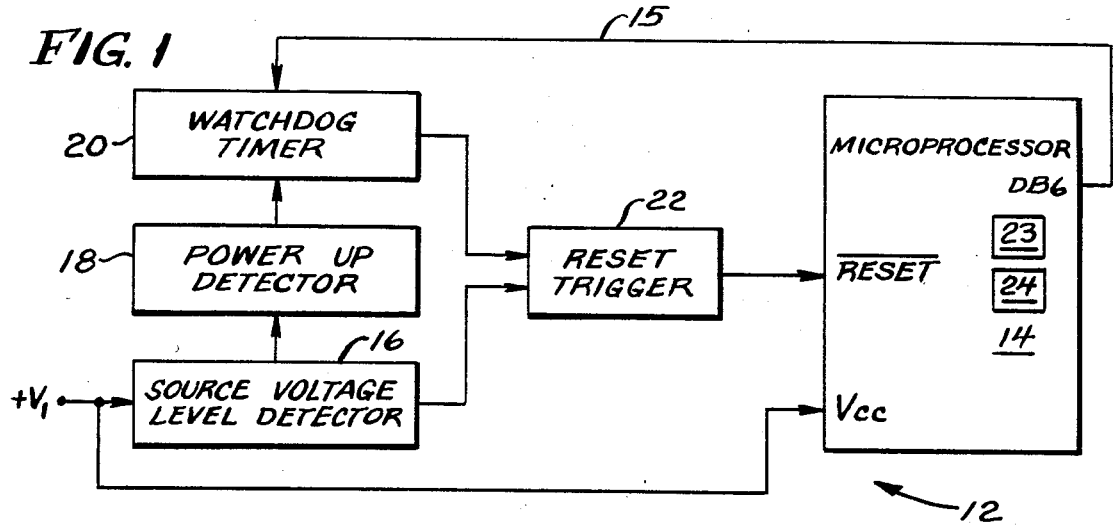
FIG. 1 is a simplified block diagram of a microprocessor reset system with power level detection and a watchdog timer in accordance with the present invention.

Referring to FIG. 1, there is shown in simplified block diagram form a microprocessor reset system 12 in accordance with the present invention.

The microprocessor reset system 12 includes a source voltage level detector 16 coupled to a $+V_1$ input voltage. The $+V_1$ input voltage is also provided to the $V_{cc}$ input pin of microprocessor 14 for the operation thereof. $V_1$ is typically $+5$ VDC, with microprocessor 14 capable of normal operation when its $V_{cc}$ input is within the range of $5\pm0.5$ VDC. Microprocessor 14 includes a read only memory (ROM) 23 in which is stored in sequence of operating instructions and logic circuitry 24 for executing the stored operating instructions. These, as well as other components within microprocessor 14, typically require well-defined input voltage levels for the proper operation thereof. Although element 14 is shown as a conventional microprocessor, the present invention is equally applicable to a conventional microcomputer.

The source voltage level detector 16 is responsive to the input voltage $+V_1$ and provides a first output to a power up detector circuit 18 when input power is initially provided to microprocessor 14. A second output is provided by the source voltage level detector 16 to a reset trigger circuit 22 when $+V_1$ is below a predetermined value, which in a preferred embodiment is 4.5 VDC. Upon receipt of an input signal from the source voltage level detector 16, the reset trigger circuit 22 provides a reset signal to microprocessor 14 to prevent its operation and ensure its reset in a low input voltage situation.

Following receipt by power up detector circuit 18 of an output from the source voltage level detector 16, a watchdog timer circuit 20 is activated and provides an input to reset trigger circuit 22. Reset trigger circuit 22 in response to an output from the watchdog timer circuit 20 provides a reset signal to microprocessor 14 for ensuring that microprocessor 14 remains in a reset condition until the input power provided thereto is sufficient to permit its proper operation.

An output is provided from the DB6 output pin of microprocessor 14 via line 15 to the watchdog timer circuit 20. As described in detail below, the DB6 output from microprocessor 14 is a series of timed pulses representing the execution of the normal control function by microprocessor 14. The absence of these output pulses or an interrupt in this pulse stream from microprocessor 14 causes watchdog timer 20 to provide a control signal to the reset trigger circuit 22 for initiating the resetting of microprocessor 14. Watchdog timer 20 thus prevents microprocessor 14 from operation in an undefined state and forces the microprocessor into a reset condition for reinitiation of normal microprocessor operation.

Figure 2:
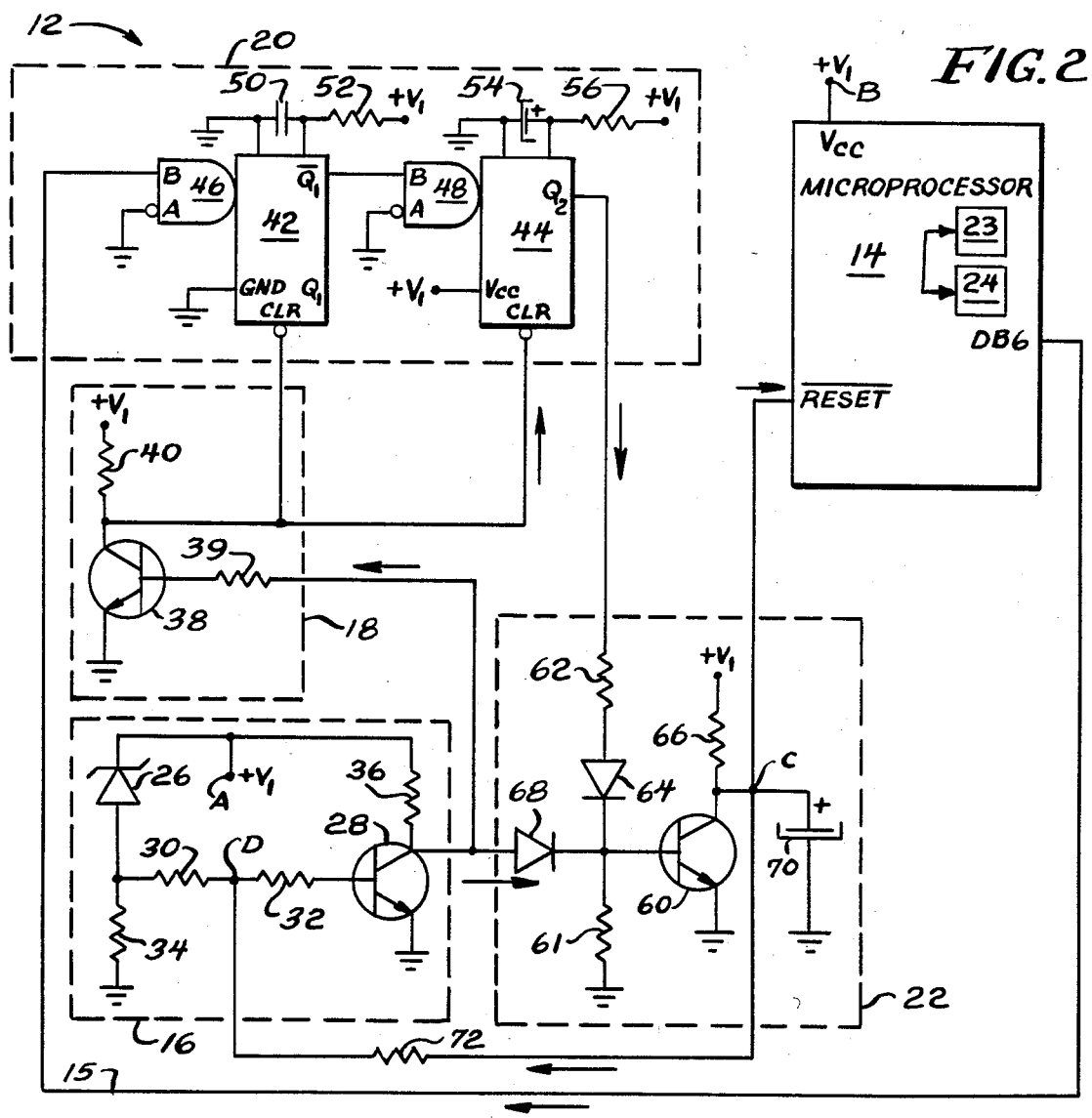
FIG. 2 is a combination schematic and block diagram showing the microprocessor reset system of FIG. 1 in greater detail.

Referring to FIG. 2, the operation and configuration of a preferred embodiment of the microprocessor reset system 12 of FIG. 1 will now be described in greater detail. The $+V_1$ input voltage is provided at point A to the source voltage level detector circuit 16 and at point B to the $V_{cc}$ power supply input pin of microcomputer 14. With the $+V_1$ input voltage applied to its $V_{cc}$ input pin, microcomputer 14 is capable of proper operation in executing the control program stored in its ROM 23 provided that its operation has been properly initialized by receipt of a reset input to its active low $\overline{RESET}$ input pin. The manner in which this reset input is provided by the microprocessor reset system 12 under various conditions is described in detail in the following paragraphs.

When the $V_1$ input voltage is applied to the source voltage level detector circuit 16, NPN transistor 28 remains nonconductive until the input voltage reaches 4.5 VDC. When the input voltage $V_1$ reaches 4.5 VDC, zener diode 26 is rendered conductive resulting in the turn-on of NPN transistor 28. If the input voltage is less than 4.5 VDC, transistor 28 will remain in a nonconducting state with its collector held high. With the collector of NPN transistor 28 held in a high state and coupled to the base of NPN transistor 60, transistor 60 is in saturation with its collector maintained at ground potential since its emitter is coupled to neutral ground. With the collector of transistor 60 coupled to the $\overline{RESET}$ input of microcomputer 14 and maintained at ground potential when the $V_1$ input voltage is less than 4.5 VDC, microcomputer 14 will remain in a reset condition until the input voltage reaches 4.5 VDC.

When the input voltage provided to point A reaches 4.5 VDC, zener diode 26 breaks down and NPN transistor 28 is rendered conductive. With transistor 28 turned on, its collector goes to ground potential resulting in the turn-off of NPN transistor 38. Resistor 34 provides a current path to ground for proper operation of zener diode 26, while resistors 30 and 32 provide for current limiting into the base of NPN transistor 28. Resistor 36 provides a voltage pull up to the collector of Q28 when Q28 is non-conducting. Similarly, transistors 28 and 38 are coupled by means of resistor 39 which limits the current to the base of the latter transistor. With transistor 28 turned off, its collector and the base of transistor 38 are held high with NPN transistor 38 in saturation and its collector grounded. In this state, the CLR (clear) inputs to monostable multivibrator circuits 42, 44 in the watchdog timer circuit 20 are low and these monostable multivibrator circuits are inoperative. With NPN transistor 38 rendered nonconductive by the turn on of transistor 28, the collector of transistor 38 goes high and the monostable multivibrator circuits 42, 44 are cleared in initiating the operation thereof. $+V_1$ is provided to the CLR inputs of monostable multivibrator circuits 42, 44 via resistor 40 to ensure that $+5$ VDC is provided thereto for the proper clearing thereof.

With monostable multivibrator 44 triggered by an input from the collector of transistor 38 to its CLR input, the $Q_2$ output of monostable multivibrator circuit 44 is triggered following a predetermined time period. This time period is established by the RC time constant of electrolytic capacitor 54 and resistor 56 which couple the $+V$ supply to the monostable multivibrator circuit 44. The RC time constant is determined for a given system by the time period the microprocessor must be maintained in a reset condition following application of the $+V_1$ input voltage thereto. In a preferred embodiment, with the present invention utilized with an 8048 microcomputer, this RC time constant is selected to provide 200 msec. The $Q_2$ output of monostable multivibrator circuit 44 is provided via resistor 62 and diode 64 to the base of NPN transistor 60. This renders transistor 60 conductive pulling its collector as well as the $\overline{RESET}$ pin of microprocessor 14 to ground. This insures that microprocessor 14 will remain in a reset condition for a predetermined period as determined by the RC time constant associated with monostable multivibrator circuit 44 following application of the $V_1$ input voltage thereto. Resistor 62 provides current limiting of $Q_2$ output through diode 64 and transistor 60, while resistor 61 provides proper biasing for NPN transistor 60. Resistor 66 performs a current limiting function within the reset trigger circuit 22. Following the timing out of monostable multivibrator circuit 44, the $Q_2$ output therefrom transistions low resulting in the turn-off of NPN transistor 60. This causes the collector of transistor 60 to go high and an input pulse to be prvoided to the $\overline{RESET}$ input of microprocessor 14. The input pulse thus provided to the $\overline{RESET}$ input pin of microprocessor 14 marks the end of the resetting of microprocessor 14 and initiates normal operation therein. The rise time of the input signal provided to the $\overline{RESET}$ input of microprocessor 14 is determined by the time constant of resistor 66 and grounded electrolytic capacitor 70.

In the case of a low input voltage provided to the $V_{cc}$ input pin of microprocessor 14, microprocessor 14 is reset in the following manner. If $V_1$ drops below a predetermined voltage level, which in a preferred embodiment is 4.5 VDC, transistor 28 will turn off causing the base of transistor 60 to go high. When the base of transistor 60 transitions to a high state, or with approximately 5 VDC applied thereto from the $Q_2$ output of monostable multivibrator circuit 44 via resistor 62 and diode 64, transistor 60 goes into saturation. This results in the grounding of the collector of transistor 60 and the $\overline{RESET}$ input of microprocessor 14. With $\overline{RESET}$ an active low input to microprocessor 14, the microprocessor will be reset when the collector of transistor 60 is maintained at ground potential. It is in this manner that microprocessor 14 is automatically reset when the power applied thereto drops below a predetermined voltage level.

During normal operation of microprocessor 14, the program stored therein provides periodic pulses at the DB6 output pin of microprocessor 14 and, via line 15, to the B input of AND gate 46 in watchdog timer circuit 20. In a preferred embodiment, the software routine in microprocessor 14 provides a pulse to the watchdog timer circuit 20 approximately every 250 microseconds indicating proper microprocessor operation. In the event microprocessor 14 becomes unstable or locks up, this output pulse train is not longer provided to the watchdog timer circuit 20. An unstable or locked-up condition of microprocessor 14 may be caused by such external influences as an electrostatic discharge, lightning, or input voltage transients. The inverted A pin of AND gate 46 is coupled to neutral ground potential. Upon termination of output pulses from microprocessor 14 to the first one-shot monostable multivibrator circuit, the $Q_1$ output therefrom transitions to a high state after a predetermined time interval determined by the RC time constant of the combination of capacitor 50 and resistor 52. Following this predetermined time period, which in a preferred embodiment is 500 microseconds, the $\overline{Q}_1$ output of monostable multivibrator circuit 42 transitions high and triggers a second one-shot monostable multivibrator circuit comprised of 44 and 48. After the second one-shot monostable multivibrator circuit is triggered by a high signal provided to the B input of AND gate 48, the $Q_2$ output of monostable multivibrator circuit 44 transistions high for a predetermined time period defined by the RC time constant of electrolytic capacitor 54 and resistor 56. In a preferred embodiment, this latter RC time constant provides a $Q_2$ output pulse 200 milliseconds to the base of NPN transistor 60 via resistor 62 and diode 64.

Under normal operating conditions, a low $Q_2$ output from monostable multivibrator circuit 44 maintains NPN transistor 60 in an OFF, or nonconducting, state such that its collector is maintained at approximately +5 VDC by means of the $V_1$ input voltage provided thereto via resistor 66. This maintains grounded electrolytic capacitor 70 in a fully charged state and the $\overline{RESET}$ input of microprocessor 14 at +5 VDC also. A high $Q_2$ output from monostable multivibrator circuit 44 results in the saturation of NPN transistor 60, with its collector approaching ground potential. This also forces the $\overline{RESET}$ input of microprocessor 14 to a low state for 200 milliseconds in insuring the proper resetting of microprocessor 14. Following the 200 millisecond interval defined by the time constant associated with monostable multivibrator circuit 44, the $Q_2$ output of monostable multivibrator circuit 44 transitions low resulting in the turn-off of transistor 60. This causes the collector of transistor 60 to go high, with approximately +5 VDC then applied to the $\overline{RESET}$ input of microprocessor 14. The time constant associated with monostable multivibrator circuit 44 thus ensures that the $\overline{RESET}$ input of microprocessor 14 is held low long enough to insure the proper resetting thereof. Virtually any reset period could be utilized in the present invention as determined by the values selected for electrolytic capacitor 54 and resistor 56. This period is disclosed as 200 msec in the present application for ensuring the proper resetting of the 8048 microcomputer.

A feedback signal is provided from point C in the reset trigger circuit 22 to point D in the source voltage level detector 16 via resistor 72. This feedback signal provides for more rapidly turning off transistor 28 by adding some system hysteresis whereby eliminating the possibility of transistor 28 is in an undefined state in which it is neither conducting nor nonconducting.

Referring to FIGS. 3A through 3D, there is shown the timing of signals in various portions of the microprocessor reset system 12 of FIG. 2. FIG. 3A shows the input power during power up, a power interrupt and power down stages of operation. From FIG. 3A, it can be seen that the input voltage $V_1$ increases to its maximum value over a first time interval when power is first applied and decreases to zero over a second time interval after power is removed. FIG. 3B shows the collector voltage of transistor 28 which increases to approximately +4.5 VDC following the application of the $V_1$ input voltage. After $V_1$ increases to the point where zener diode 26 is rendered conductive, transistor 28 turns on causing its collector to go low. Following a power interrupt, the collector voltage of transistor 28 increases again to approximately 4.5 VDC when transistor 28 is turned off, but again returns to zero when transistor 28 is rendered conductive by the +4.5 VDC applied across zener diode 26 to the base of transistor 28.

FIG. 3C shows the pulsed $Q_2$ output from monostable multivibrataor circuit 44 for turning transistor 60 on and applying a reset pulse to the $\overline{RESET}$ input of microprocessor 14. The high transistion of the $Q_2$ output of monostable multivibrator circuit 44 is triggered by the turn-on of transistor 28, with the pulse length of the $Q_2$ output determined by the RC time constant of electrolytic capacitor 54 and resistor 56, as previously explained. When the $Q_2$ output of monostable multivibrator circuit 44 transistions low, transistor 60 stops conducting and its collector goes high as shown in FIG. 3D. When the collector of transistor 60 is high, the RESET input of microprocessor 14 is also held high following the resetting thereof. Transistor 60 will remain in a nonconducting state until either the next pulse is received from the $Q_2$ output of monostable multivibrator circuit 44 or the collector of transistor 28 goes high.

Referring to FIGS. 4A, 4B and 4C, there are shown the signal levels in various portions of the microprocessor reset system 12 of FIG. 2 during the resetting of the microprocessor by the watchdog timer circuit 20. FIG. 4A shows the output pulses provided during normal microprocessor operation from its DB6 pin to the B input of AND gate 46 in watchdog timer circuit 20. These pulses are spaced 250 microseconds apart and, while received by watchdog timer circuit 20, maintain the first one-shot monostable multivibrator in a triggered state. FIG. 4B shows the voltage at the collector of transistor 60. From FIG. 4B it can be seen that during normal operation transistor 60 is maintained in a nonconducting state, with its collector held high at approximately +4.5 VDC. Following an interruption in the pulses provided to watchdog timer circuit 20 from microprocessor 14, the $Q_2$ output of monostable multivibrator circuit 44 goes high for a predetermined time period, e.g., 200 milliseconds as shown in FIG. 2B, resulting in the saturation of transistor 60. The collector of transistor 60 is then held low as is the RESET input of microprocessor 14 for the aforementioned 250 millisecond period thus insuring the resetting of microprocessor 14 as shown in FIG. 4C which illustrates the input to the RESET input to the microprocessor.

There has thus been shown a microprocessor reset system which inlcudes power level detection as well as a watchdog timer for automatically resetting the microcomputer when input voltage variations as well as program execution irregularities occur. By combining the power reset and watchdog timer functions in a single circuit, microprocessor peripheral drive circuitry is simplified, less expensive and more reliable.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A system for controlling the operation of signal processing means, said signal processing means energized by an input voltage and including a programmed memory having a plurality of addressable locations wherein are stored instruction words which define operating sequences and further including logic means coupled to said programmed memory for accessing said plurality of addressable locations for sequentially executing said instruction words in generating a status signal in the form of a single, periodic, continuous pulse train in accordance with said operating sequences during normal operation of said signal processing means, said signal processing means responsive to a reset command provided thereto for maintaining said signal processing means in a reset condition wherein said logic means accesses an initialization addressable location in said programmed memory in setting the execution of the programmed instruction words to a predetermined initial point in said operating sequences from which a predetermined sequence of initializing operations is automatically initiated, said system comprising:

voltage level detection means responsive to said input voltage for generating a first signal when said input voltage does not exceed a predetermined voltage level and a second signal when said input voltage exceeds said predetermined voltage level;

first signal detection means coupled to said signal processing means and responsive to the absence of said status signal and further coupled to said voltage level detection means and responsive to receipt of said first signal for generating a single third signal of predetermined duration, said first signal detection means including a single first timing circuit for generating said single third signal when a pulse is not received from said signal processing means within a predetermined time interval of receipt of an immediately preceding pulse; and second signal detection means coupled to said signal processing means, to said voltage level detection means and to said first signal detection means and responsive to said second and single third signals respectively output therefrom for immediately providing a reset command of said predetermined duration to said signal processing means when said input voltage does not exceed said predetermined voltage level or when said status signal is no longer output by said signal processing means for maintaining the signal processing means in the reset condition for said predetermined duration prior to application of an input voltage greater than said predetermined voltage level thereto.

2. A system as in claim 1 wherein said first signal detection means further includes a second timing circuit having a characteristic RC time constant equal to the predetermined duration of said single third signal for the generation thereof.

3. A system as in claim 2 wherein the single first timing circuit and the second timing circuit of said first signal detection means respectively comprise first and second triggerable self-oscillating circuits which are coupled together and are respectively responsive to said status signal and to said first signal.

4. A system as in claim 3 wherein said first and second triggerable self-oscillating circuits respectively comprise first and second one-shot monostable multivibrators having first and second time constants respectively associated therewith.

5. A system as in claim 4 wherein said system further includes power up detector means coupling said voltage level detection means to said first signal detection means and responsive to said first signal for providing a clear input to said one-shot monostable multivibrators in initiating the output of said single third signal therefrom.

6. A system as in claim 1 wherein said reset command is an active low signal and said second signal detection means includes means for maintaining a reset input of said signal processing means in a high state in the absence of said reset command.

7. A system as in claim 6 wherein said reset input of the signal processing means is maintained in a high state in the absence of said reset command by means of said input voltage provided to said second signal detection means.

8. A system for resetting a microprocessor to an initialization point in the operating program thereof in response to an input voltage interrupt, improper execution of said operating program by said microprocessor, or the application of an input voltage to said microprocessor, wherein said microprocessor generates a timed output signal in the form of a single periodic, continuous, pulse train representing normal execution of said operating program by said microprocessor and said microprocessor is responsive to a reset signal provided thereto in initiating a reset condition in the operation thereof whereby said microprocessor is reset to said initialization point in the operation thereof and wherein said microprocessor is maintained in said reset condition for a predetermined period prior to application of an input voltage equal to or greater than a predetermined voltage level, said system comprising:

first means for detecting said input voltage, for comparing said input voltage to said predetermined voltage level, and for generating a first signal when said input voltage is less than said predetermined voltage level;

signal detection means coupled to said first means and responsive to said first signal output therefrom when said input voltage is less than said predetermined voltage level for generating a single time delayed second signal relative to receipt by said signal detection means of said first signal wherein the time delay of said single second signal is equal to or greater than said predetermined period, said signal detection means further coupled to said microprocessor and including a single timing circuit responsive to the absence of said timed output signal from said microprocessor for generating said single time delayed second signal when a pulse is not received from said microprocessor within a predetermined time interval of receipt of an immediately preceding pulse; and reset signal means coupled to said microprocessor and to said first means and responsive to said first signal output therefrom for immediately providing a reset signal to said microprocessor when said input voltage is less than said predetermined voltage level, said reset signal means further coupled to said signal detection means and responsive to said single time delayed second signal therefrom for immediately providing said reset signal to said microprocessor upon detection by said single timing circuit of the absence of said time output signal therefrom indicating improper operation of said microprocessor and for maintaining said microprocessor in said reset condition for said predetermined period prior to application of an input voltage equal to or greater than said predetermined voltage level to said microprocessor to ensure the proper resetting thereof.

* * * * *